United States Patent
Gulde

(10) Patent No.: US 7,651,124 B2
(45) Date of Patent: Jan. 26, 2010

(54) STEER-BY-WIRE STEERING WHEEL UNIT WITH INTEGRATED AIRBAG MODULE

(75) Inventor: Alexander Gulde, Haimhausen (DE)

(73) Assignee: Autoliv Development AB, Varqarda (SE)

( * ) Notice: Subject to any disclaimer, the term of this patent is extended or adjusted under 35 U.S.C. 154(b) by 287 days.

(21) Appl. No.: 11/578,032

(22) PCT Filed: Apr. 12, 2005

(86) PCT No.: PCT/EP2005/003837

§ 371 (c)(1),
(2), (4) Date: Oct. 12, 2006

(87) PCT Pub. No.: WO2005/102815

PCT Pub. Date: Nov. 3, 2005

(65) Prior Publication Data

US 2007/0209858 A1    Sep. 13, 2007

(30) Foreign Application Priority Data

Apr. 20, 2004   (DE) .................... 10 2004 019 066

(51) Int. Cl.
B62D 5/04 (2006.01)
B60R 21/16 (2006.01)
(52) U.S. Cl. .................... 280/731; 180/402; 180/444
(58) Field of Classification Search ................ 280/731; 180/402, 444; 74/552, 388 PS
See application file for complete search history.

(56) References Cited

U.S. PATENT DOCUMENTS

| | | | |
|---|---|---|---|
| 4,405,924 A | 9/1983 | Shinoda et al. | |
| 6,079,513 A | 6/2000 | Nishizaki et al. | |
| 6,219,604 B1 | 4/2001 | Dilger et al. | |
| 6,283,859 B1 * | 9/2001 | Carlson et al. | 463/36 |
| 6,343,670 B1 | 2/2002 | Mindl et al. | |
| 6,550,565 B2 * | 4/2003 | Thomas et al. | 180/402 |
| 6,712,175 B2 | 3/2004 | Kind et al. | |
| 6,892,605 B2 * | 5/2005 | Menjak | 74/552 |
| 2002/0005315 A1 | 1/2002 | Kind et al. | |
| 2003/0146037 A1 * | 8/2003 | Menjak et al. | 180/402 |
| 2003/0164060 A1 | 9/2003 | Menjak | |
| 2003/0209381 A1 | 11/2003 | Menjak et al. | |

FOREIGN PATENT DOCUMENTS

| | | |
|---|---|---|
| DE | 31 11 029 A1 | 1/1982 |
| DE | 199 12 169 A1 | 7/2000 |
| DE | 199 04 321 A1 | 8/2000 |
| DE | 100 20 085 C1 | 7/2001 |
| DE | 100 21 814 A1 | 11/2001 |

(Continued)

*Primary Examiner*—Paul N Dickson
*Assistant Examiner*—Drew Brown
(74) *Attorney, Agent, or Firm*—Harness, Dickey & Pierce, P.L.C.

(57) ABSTRACT

A steering wheel unit for a steer-by-wire steering system in motor vehicles, consisting of a steering wheel (12), an airbag module, a steering wheel angle sensor unit (24) as well as a force feedback unit, is characterized in that steering wheel (12) is located in rotatable fashion on module housing (10) of the airbag module, which is fixed to the vehicle, and that module housing (10) forms the stator and steering wheel (12) the rotor of the force feedback unit formed as an electric motor.

17 Claims, 4 Drawing Sheets

FOREIGN PATENT DOCUMENTS

Figure 1:
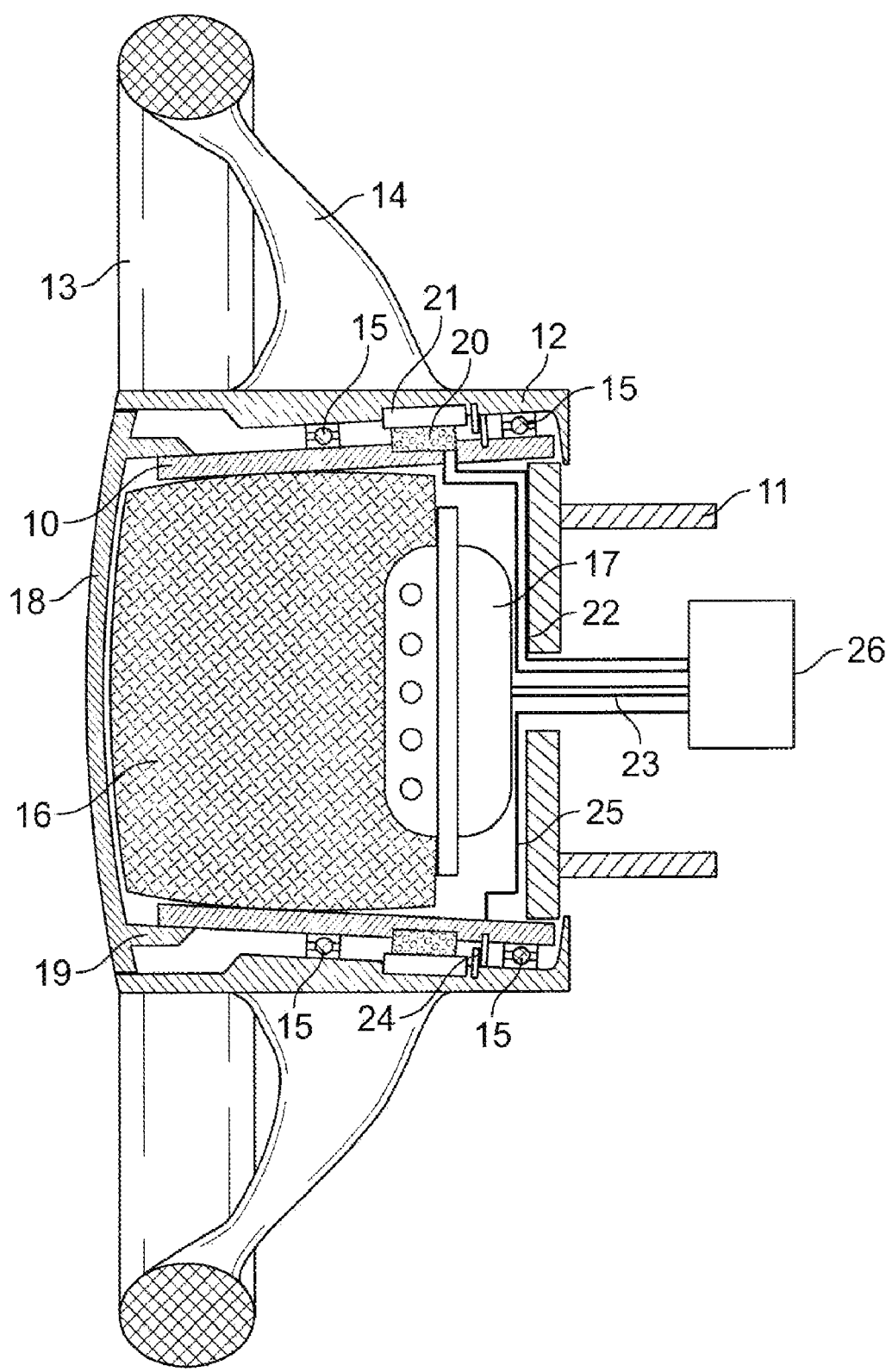

| | | |
|---|---|---|
| EP | 1 342 639 A2 | 9/2003 |
| JP | 08-096913 A | 4/1996 |
| JP | 10-226346 A | 8/1998 |
| JP | 2001-010516 A | 1/2001 |
| WO | WO 03/057547 A | 7/2003 |

* cited by examiner

STEER-BY-WIRE STEERING WHEEL UNIT WITH INTEGRATED AIRBAG MODULE

DESCRIPTION

The invention relates to a steering wheel unit for a steer-by-wire steering system in motor vehicles, consisting of a steering wheel, an airbag module, a steering wheel angle sensor unit and a force feedback unit.

A steering wheel unit with the aforementioned characteristics is described in DE 102 00 826 C1. Here a piston rod which bears the steering wheel with the airbag module integrated in it and which is therefore rotatable with the steering wheel is guided in a housing which accommodates a force limiting device, whereby a force feedback unit and a steering wheel angle sensor unit are located on said housing.

The function of a force-feedback unit and of a steering wheel angle sensor unit is described in detail in DE 199 12 169 A1. According to this document, the road feel which is lost because of the loss of a steering column which is rigidly connected with the steered front axle, which in the traditional type of steering is communicated by the return force, i.e. by a force exerted on the driver's hand on the wheel, is to be reinstated with the help of the force feedback unit, which is, for example, in the form of an electric motor. The current supply of this electric motor, and therefore the size of the force which has to be used to counter the rotary movement of the steering wheel as steering force, is controlled by means of a control unit, in which the necessary voltage values for control of the electric motor are determined by means of corresponding influencing variables. Correspondingly, the turning of the steering wheel by a certain angle undertaken by the driver is detected by the steering wheel angle sensor unit and transferred to the control unit, which carries out corresponding actuation of a steering actuator which executes the steering movement which has been entered, whereby the steering actuator is preferably in the form of an electric motor.

The steering wheel unit including an airbag module which is known from the generic patent DE 102 00 826 C1 involves the disadvantage that the arrangement of a separate housing for accommodating the piston rod which carries the steering wheel as well as the force feedback unit and the steering wheel angle sensor unit takes up a large amount of space and also correspondingly includes a large number of separate components.

The invention is therefore based on the task of enabling a more compact form of a steering wheel with the generic characteristics, which can be mounted in a vehicle in a space-saving fashion.

The solution of this task, including advantageous forms and further developments, results from the contents of the patent claims which follow this description.

The basic principle of the invention is that the steering wheel is carried on the module housing of the airbag module, which is attached to the vehicle in fixed fashion, so as to be rotatable.

As the airbag module is attached in fixed fashion and therefore always takes up an identical position relative to the vehicle occupants, greater freedom as regards the design of the airbag configuration advantageously results than is possible in the case of an airbag module which turns along with the steering module, as here the position of the airbag in relation to the vehicle occupants depends on the angular position of the steering wheel.

According to one embodiment of the invention, it is provided that the module housing forms the stator and the steering wheel the rotor of the force feedback unit, which is in the form of an electric motor. This involves the advantage that a twin function is allocated to the module housing of the airbag module, as the module housing is additionally designed as a rotating bearing for the steering wheel which is located on it in rotatable fashion, and as the carrier for the corresponding components of the force feedback unit. Because of this double function, a more compact construction of the complete steering wheel unit with the integrated airbag module results, and this steering wheel unit can therefore be accommodated in the vehicle at a lesser distance to the vehicle instrument panel.

According to one embodiment of the invention it is provided that the steering wheel angle sensor unit is located between the fixed module housing and the steering wheel which is located on it so as to be rotatable; therefore as a whole, reduction of the number of components is associated with such a design of the steering unit, which means that assembly of the steering wheel angle unit is simplified.

According to one embodiment of the invention it is provided that the module housing as stator is provided with a wire winding and that a permanent magnet is located in the steering wheel acting as a rotor; in so far as there are no additional function buttons located on the steering wheel, for example for activation of radios, telephones etc., with the associated necessity of signal transfer, this embodiment offers particularly simple structure of the steering wheel unit without the need for connection of the rotating steering wheel to a control component fixed to the vehicle.

In so far as, in other embodiments of the invention, further function buttons are located on the rotating steering wheel for activation of radio, telephone etc., and it is therefore necessary for the corresponding signals to be transferred, according to one embodiment a spiral spring is provided between the rotatable steering wheel and a control unit which is located so as to be fixed to the vehicle. As an alternative, a radio device with a transmitter-receiver unit located on the steering wheel and a transmitter-receiver unit fixed to the vehicle can be provided; and finally, the correspondingly generated signals could also be transferred by means of induction.

According to one embodiment of the invention, the airbag cover cap which covers the module housing is connected with the fixed module housing, which in turn results in the advantage that the set break lines which are generally provided for opening of the airbag cover cap are constant as regards their position, and therefore the opening movement of the parts of the cover cap is calculable and foreseeable.

In order to avoid a gap between the airbag cover cap and the steering wheel which could have a negative effect on appearance, it can also be provided that the airbag cover cap which covers the module housing is connected with the steering wheel and is therefore arranged so as to be rotatable in relation to the fixed module housing.

According to embodiments of the invention it is also possible to locate the gas generator of the airbag module either inside or outside the module housing, and with this comes the advantage of a greater degree of design freedom with regard to the steering wheel.

Figure 2:
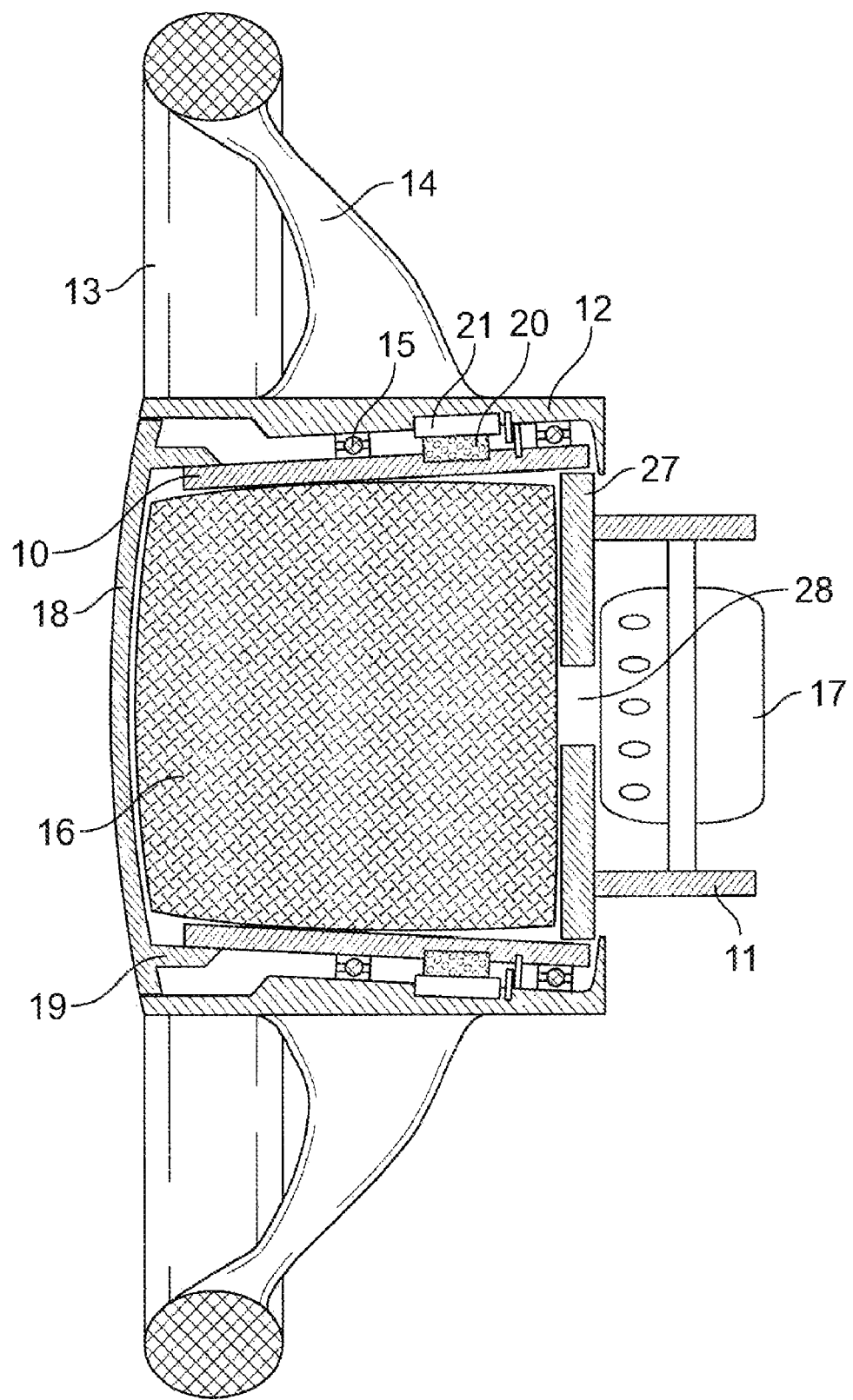
Figure 3:
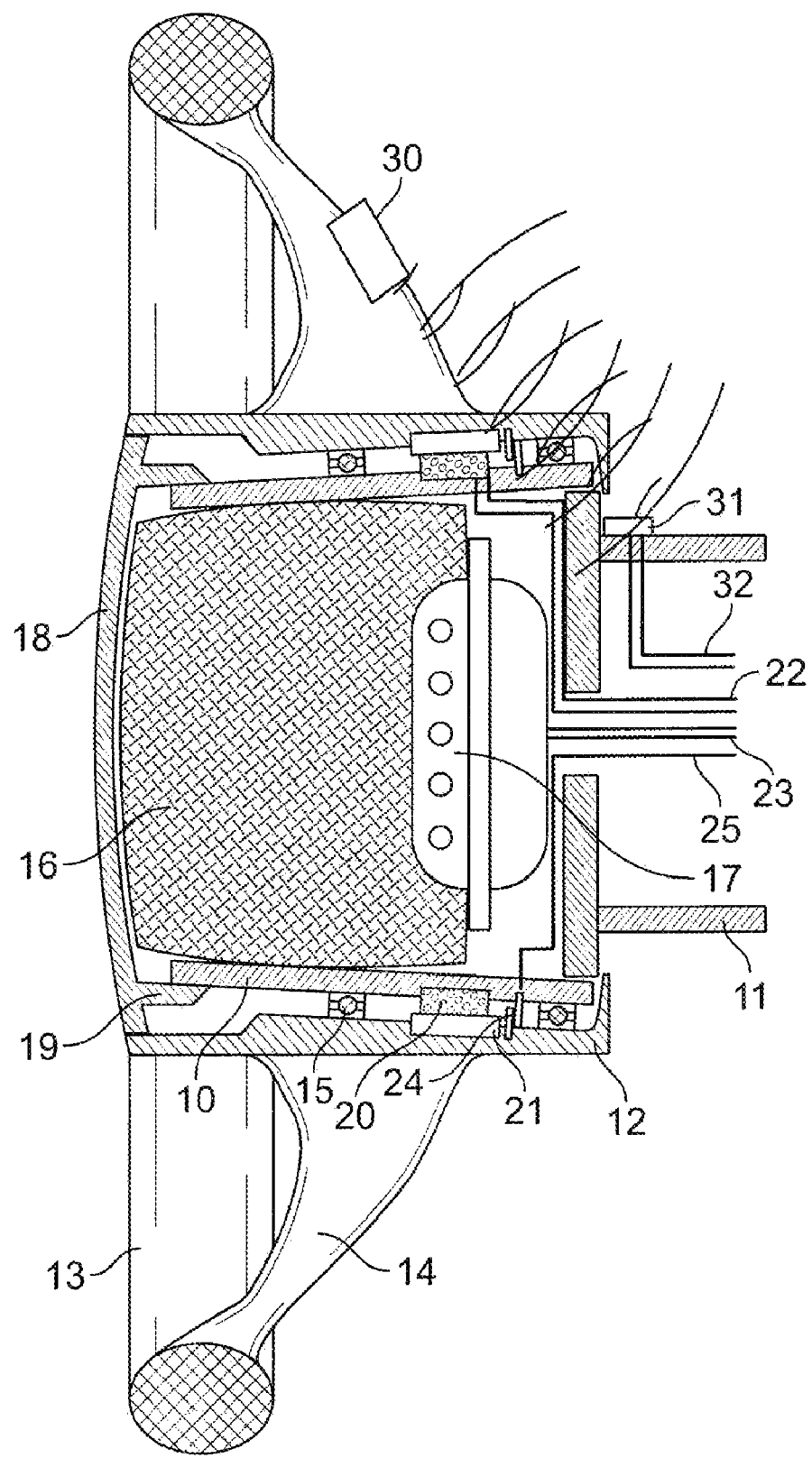
Figure 4:
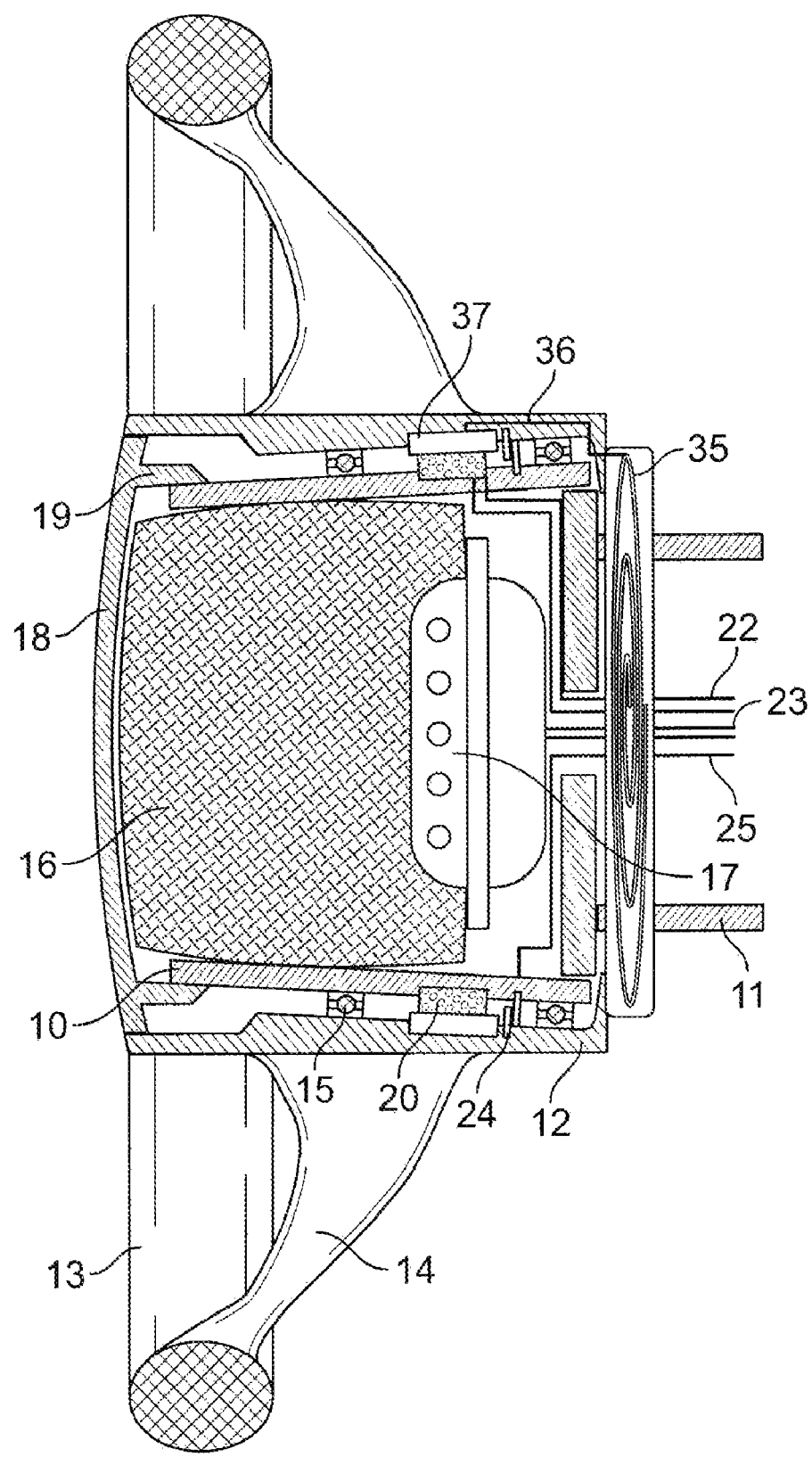

Embodiments of the invention are shown in the drawing, which are described below. These are as follows:

FIG. 1 a steering wheel unit in a schematic, partial section side view,

FIG. 2 an embodiment of the item shown in FIG. 1 with a gas generator located outside the module housing, FIG. 3 an embodiment of the invention shown in FIG. 1 with radio transfer of signals additionally provided between the steering wheel and the vehicle, FIG. 4 A further embodiment of the invention with connection of the rotatable steering wheel with the vehicle via a spiral spring.

As can first be seen from FIG. 1, module housing 10 of an airbag module is connected via fixing elements 11 with a vehicle component in the area of the vehicle instrument panel, not shown, so that module housing 10 is located so as to be fixed.

A steering wheel 12 is positioned on bearing locations 15 on module housing 10 so as to be rotatable, whereby steering wheel 12 consists of a steering wheel rim 13 and steering wheel spokes 14.

In the case of the embodiment shown in FIG. 1, an airbag 16 and a gas generator 17 are arranged in the interior of module housing 10, whereby the space of module housing 10 for accommodating these is closed by means of an airbag cover 18, which in the embodiment shown is connected in fixed fashion with module housing 10 by means of fixing arrangement 19, so that steering wheel 12 rotates in relation to airbag cover 18.

In order to form a force feedback unit designed in a known manner as an electric motor, a wire winding 20 is attached on the outer side of module housing 10, to which a permanent magnet 21 is assigned on steering wheel 12, so that, when current is applied to wire winding 20 and steering wheel 12 is turned, a corresponding turning resistance is generated. Wire winding 20 is connected to a control unit 26 arranged so as to be fixed to the vehicle via control leads 22, whereby control unit 26 for its part is connected with gas generator 17 of the airbag module via control leads 23, so that the airbag module can also be triggered via control unit 26. Finally, a steering wheel angle sensor 24 is located between fixed module housing 10 and rotating steering wheel 12, which is also connected to control unit 26 fixed to the vehicle by means of an associated control lead 25.

The function of the steer-by-wire steering wheel described above is described in detail in DE 199 12 169 A1 and is therefore not an object of the present invention; therefore attention is drawn here to the publication of this document.

The embodiment shown in FIG. 2 only differs from the embodiment described in relation to FIG. 1 in that gas generator 17 is located outside the module housing 10 inside the vehicle, so that in floor 27 of module housing 10 an opening 28 is provided for transfer of the gas generated by gas generator 17 into airbag 16 folded inside module housing 10. For the sake of simplicity, in the case of the embodiment shown in FIG. 2, the control unit, including the associated control leads, is not shown.

The embodiment shown in FIG. 3 corresponds in form with the embodiment described in relation to FIG. 1 with a gas generator 17 located inside module housing 10. In addition, 12 further function buttons (not shown) are located on steering wheel 12, for example for operation of radio, telephone etc., so that correspondingly, signals are to be transferred from these function buttons or from the rotating steering wheel to the central control unit. In the case of the embodiment shown in FIG. 3, a transmitter-receiver unit 30 is located on steering wheel 12 for transfer of these signals, to which a transmitter-receiver unit 31 on the vehicle is assigned, which for its part is connected with central control unit 26 (not shown) by means of control leads 32.

Alternatively, in accordance with FIG. 4, a spiral spring 35 can be provided in order to transfer signals or energy to the additional components located in the rotating steering wheel, which in the embodiment shown is connected with the magnets 37 in the form of electromagnets of the force feedback unit via control lead 36.

The characteristics of the object revealed in the above description, the patent claims, the summary and the drawing contained in these documents can be of importance both separately and in any combination or combinations with one another for realisation of the invention in its different embodiments.

The invention claimed is:

1. A steering wheel unit for a steer-by-wire steering system in motor vehicles, the steering wheel unit comprising a steering wheel, an airbag module including an airbag module housing fixed to the vehicle, a steering wheel angle sensor unit and a force-feedback unit, wherein the steering wheel is mounted rotatably on the airbag module housing, and wherein the airbag module housing forms a stator of the force-feedback unit, which is constructed as an electric motor.

2. A steering wheel unit according to claim 1, wherein the steering wheel forms a rotor of the force-feedback unit.

3. A steering wheel unit according to claim 1, wherein the steering wheel angle sensor unit is located between the airbag module housing and the steering wheel and is located on the steering wheel so as to be rotatable therewith.

4. A steering wheel unit according to claim 1, wherein the airbag module housing includes a wire winding acting as the stator and the steering wheel includes a permanent magnet acting as a rotor.

5. A steering wheel unit according to claim 1, further comprising function buttons and a spiral spring associated with the steering wheel, the spiral spring transferring at least one of signals and energy to the function buttons.

6. A steering wheel unit according to claim 1, further comprising function buttons supported by the steering wheel, the function buttons including a radio device with a transmitter-receiver unit located on the steering wheel and a transmitter-receiver unit connected with a control unit and attached to the vehicle.

7. A steering wheel unit according to claim 1, further comprising function buttons supported by the steering wheel and in communication with a control unit, the function buttons communicating with the control unit via induction.

8. A steering wheel unit according to claim 1, further comprising an airbag cover cap that covers and is connected to the airbag module housing.

9. A steering wheel unit according to claim 1, further comprising an airbag cover cap that covers the airbag module housing, is connected to the steering wheel, and is rotatable relative to the airbag module housing.

10. A steering wheel unit according to claim 1, wherein the airbag module includes a gas generator located inside the airbag module housing.

11. A steering wheel unit according to claim 1, wherein the airbag module includes a gas generator located outside of the airbag module housing.

12. A steering wheel unit for a steer-by-wire steering system, the steering wheel unit comprising a force-feedback unit, an airbag module including a housing, and a steering wheel rotatably attached to the housing, the steering wheel forming a rotor of the force-feedback unit and the housing forming a stator of the force-feedback unit.

13. A steering wheel unit according to claim 12, wherein the force-feedback unit is constructed as an electric motor.

14. A steering wheel unit according to claim 12, further comprising a steering wheel angle sensor unit.

15. A steering wheel unit according to claim 12, further comprising a wire winding and a magnet.

16. A steering wheel unit according to claim 15, wherein the wire winding is attached to the housing and the magnet is attached to the steering wheel.

17. A steering wheel unit for a steer-by-wire steering system, the steering wheel unit comprising a force-feedback unit, an airbag module including a housing, and a steering wheel rotatably attached to the housing and supporting a magnet of the force-feedback unit the magnet is fixed to the steering wheel for rotation therewith.

* * * * *